United States Patent
Roland et al.

(10) Patent No.: US 10,086,680 B2
(45) Date of Patent: Oct. 2, 2018

(54) INTEGRATED SUNROOF DRAINAGE CONDUIT

(71) Applicant: Ford Global Technologies, LLC, Dearborn, MI (US)

(72) Inventors: Jeffrey Roland, Canton, MI (US); Shelley Bolbrugge, Commerce Township, MI (US); Michael James Freeman, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/438,159

(22) Filed: Feb. 21, 2017

(65) Prior Publication Data
US 2018/0236853 A1    Aug. 23, 2018

(51) Int. Cl.
B60J 7/00    (2006.01)
B62D 25/24    (2006.01)

(52) U.S. Cl.
CPC ............ *B60J 7/0084* (2013.01); *B62D 25/24* (2013.01)

(58) Field of Classification Search
CPC ........................................... B60J 7/0084
USPC ............. 296/213, 208, 190.09; 138/114, 115
See application file for complete search history.

(56) References Cited

U.S. PATENT DOCUMENTS

| | | | |
|---|---|---|---|
| 2,991,120 A * | 7/1961 | Barenyi | B60R 9/04 296/208 |
| 3,004,330 A * | 10/1961 | Wilkins | B21C 37/14 138/115 |
| 4,728,145 A | 3/1988 | Benedetto | |
| 4,906,496 A * | 3/1990 | Hosono | B29C 47/0023 138/111 |
| 4,975,055 A * | 12/1990 | LaPlante | F16L 9/19 138/111 |
| 5,400,828 A * | 3/1995 | Ziu | F16L 7/00 138/111 |
| 5,996,639 A * | 12/1999 | Gans | B29C 49/0021 138/115 |
| 6,189,961 B1 * | 2/2001 | Poliskie | B60R 13/07 296/208 |
| 6,311,730 B2 * | 11/2001 | Penza | F16L 11/20 138/114 |
| 6,394,142 B1 * | 5/2002 | Woelfel | F16L 11/22 138/115 |
| 7,568,757 B2 | 8/2009 | Romig | |
| 7,753,082 B2 * | 7/2010 | Anno | F16L 11/20 138/108 |

(Continued)

*Primary Examiner* — Dennis H Pedder
(74) *Attorney, Agent, or Firm* — Vichit Chea; Brooks Kushman P.C.

(57) ABSTRACT

A sunroof drainage conduit integrated into a heating, ventilation and air conditioning duct (HVAC) duct for a vehicle is provided. The duct may include an elongated, hollow body defining an air passage. The drainage conduit may be integrally formed on a surface of the body of the duct, such as an inside surface or an outside surface. The integrated drainage conduit may be routed through the duct's air passage or around the duct's exterior. A first drain tube may connect the sunroof to an inlet of the drainage conduit for directing drainage away from the sunroof's gutter or trough. A second drain tube may connect to an outlet of the drainage conduit for directing drainage from the drainage conduit to ambient.

15 Claims, 6 Drawing Sheets

(56) References Cited

U.S. PATENT DOCUMENTS

| | | | |
|---|---|---|---|
| 8,978,711 B2* | 3/2015 | Satou | F16L 9/19 138/114 |
| 2001/0017163 A1* | 8/2001 | Penza | F16L 11/20 138/98 |
| 2008/0061604 A1* | 3/2008 | Tiesler | B60H 1/0055 296/214 |

* cited by examiner

INTEGRATED SUNROOF DRAINAGE CONDUIT

TECHNICAL FIELD

The present disclosure is directed to a drainage conduit for a sunroof and, more particularly, to a drainage conduit integrated with an air conditioning duct.

BACKGROUND

Many automotive vehicles today are equipped with sunroof assemblies. A sunroof is a panel on the roof of a vehicle that permits light, air or both into the vehicle. There are many types of sunroofs. A typical sunroof assembly has an opening provided in the roof of the vehicle. A panel, typically made of glass, is provided for closing the opening. The sunroof panel may move between an opened position and a closed position, either by a sliding motion or by a tilting motion of the sunroof panel. The sunroof assembly includes a mechanism to move the sunroof panel. The mechanism may be driven either manually or by an external power source such as an electric motor. The sunroof panel includes a seal that keeps out rainwater from the passenger cabin when the sunroof is closed. The sunroof assembly also includes a trough or gutter that extends around the edge of the roof opening and collects drainage such as water that passes through the seal. Drain tubes connect to the corners of the trough to carry the drainage away. The drain tubes are often routed along the roof rails and/or pillars of the vehicle to an outlet and then into the ambient. The drain tubes are hidden from view by the headliner of the roof or by an inner trim panel along a vehicle pillar.

A pillar is a vertical or near vertical support around a vehicle's window area, often referred to as the greenhouse. The pillars are designated as the A-, B-, C- or (in larger cars) D-pillar, moving from the front to rear of the vehicle. In addition to providing structural support, the pillars in automotive vehicles provide important packaging space, particularly as more content is introduced in a vehicle. Vehicle content packaged inside the pillars includes speakers, seat restraints, wires, and the like. Larger vehicles, such as SUVs and vans, may utilize heating, ventilation and air conditioning (HVAC) ducting to distribute air towards the rear of the larger passenger cabins. The source of the air may come from either primary or auxiliary climate systems. The HVAC ducting is often packaged, in part, in a vehicle pillar, such as the C-pillar.

SUMMARY

One or more embodiments of the present disclosure is directed to an air duct for a vehicle having a sunroof. The air duct may include an elongated, hollow body defining an air passage and a drainage conduit integrally formed on the body. The air duct may further include an inlet at a first end of the conduit for receiving drainage from the sunroof and an outlet at a second end of the conduit for draining the drainage to ambient.

The conduit may be integrally-formed on an inside surface of the body. Additionally or alternatively, the conduit may be integrally-formed on an outside surface of the body. The body may include at least a first side wall and a second side wall opposite the first side wall. The conduit may include a first substantially vertical portion formed on the first side wall, a second substantially vertical portion formed on the second side wall, and a transverse portion extending across the air passage connecting the first substantially vertical portion to the second substantially vertical portion. The transverse portion may extend across the air passage along an inside surface of the body.

The body may also include at least one elongated wall connecting the first side wall to a second side wall. The conduit may include the first substantially vertical portion formed on the first side wall, the second substantially vertical portion formed on one of either the elongated wall or the second side wall opposite the first side wall. A transverse portion may be formed at least partially on the elongated wall. The transverse portion may connect the first substantially vertical portion to the second substantially vertical portion. The transverse portion may include a bend at a first corner of the body where the first side wall meets the elongated wall. The transverse portion may include another bend at a second corner of the body where the elongated wall meets the second side wall.

On or more additional embodiments of the present disclosure is directed to a drainage system for a sunroof. The drainage system may include a duct and a drain tube. The duct may be mounted to a vehicle pillar. The duct may have a hollow body defining an air passage and a drainage conduit integrally formed on the body. The conduit may have an inlet and an outlet. The drain tube may connect the sunroof to the inlet.

The sunroof may include a trough having an aperture. The drain tube may include an inlet portion connected to the aperture and an outlet portion connected to the inlet of the conduit. A second drain tube may be provided connecting the conduit to ambient. The second drain tube may have an inlet portion connected to the outlet of the conduit and an outlet portion coupled to ambient.

The conduit may be integrally-formed on an inside surface of the body. Additionally or alternatively, the conduit may be integrally-formed on an outside surface of the body. The body may include at least a first side wall and at least one elongated wall connecting the first side wall to a second side wall opposite the first side wall. The conduit may include a first substantially vertical portion formed on the first side wall, a second substantially vertical portion formed on one of either the elongated wall or the second side wall, and a transverse portion formed at least partially on the elongated wall. The transverse portion may connect the first substantially vertical portion to the second substantially vertical portion.

Alternatively, the conduit may include the first substantially vertical portion formed on the first side wall, the second substantially vertical portion formed on the second side wall, and the transverse portion extending across the air passage connecting the first substantially vertical portion to the second substantially vertical portion. The transverse portion may extend across the air passage along an inside surface of the body.

One or more additional embodiments of the present disclosure is directed to a vehicle comprising a frame including a pillar and a roof having an opening. The vehicle may further include a sunroof selectively exposing a portion of the opening. A duct, mounted to the pillar, may have a hollow body defining an air passage. A drainage conduit may be integrally formed on the body. A drain tube may extend from the sunroof to an inlet on the conduit.

A second drain tube may extend from an outlet on the conduit to ambient. The conduit may be integrally-formed on an inside surface of the body. Additionally or alternatively, the conduit may be integrally-formed on an outside surface of the body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
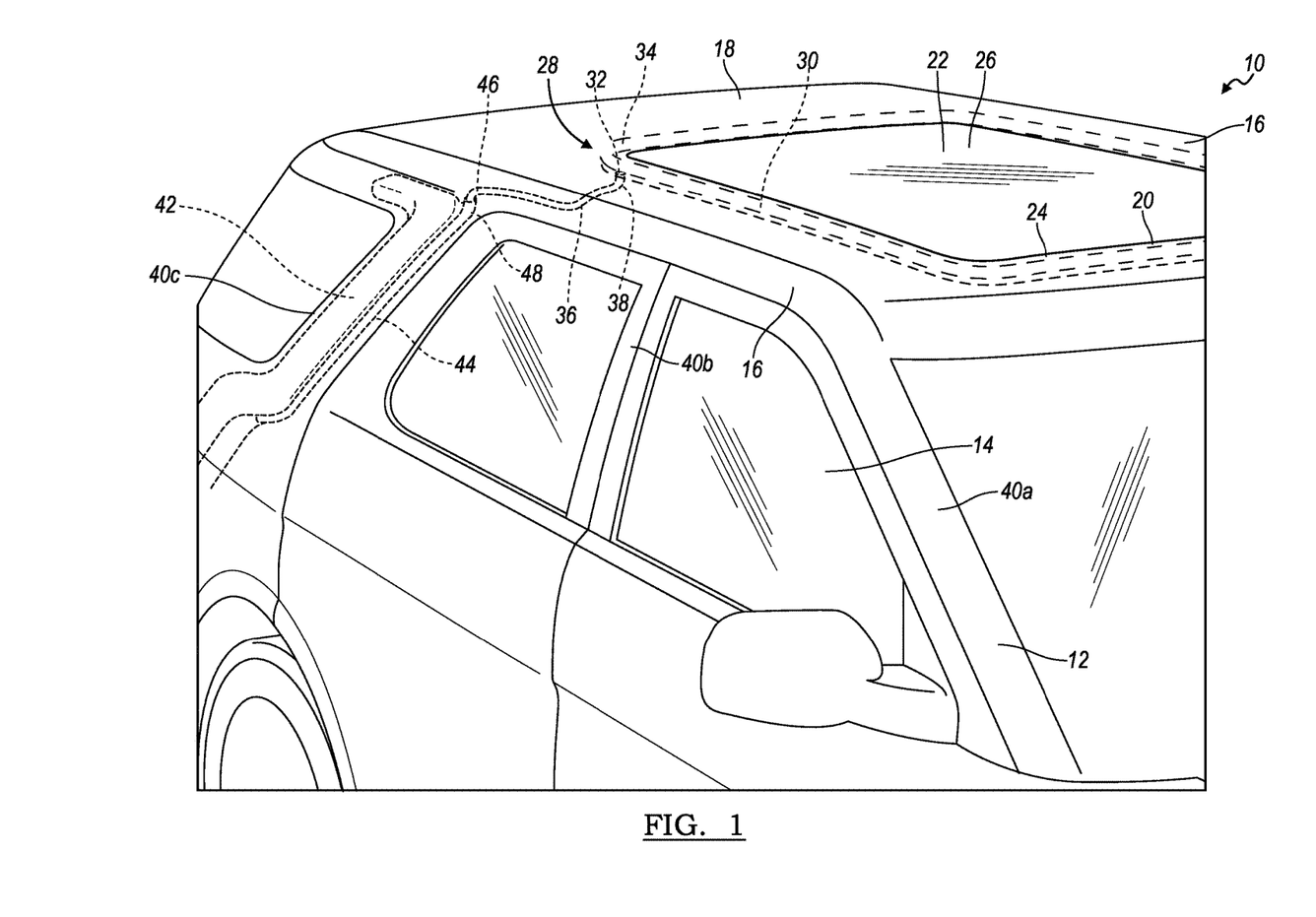
FIG. 1 is a partial perspective view of a vehicle having a sunroof and a sunroof drainage system, according to one embodiment of the present disclosure.

FIG. 1 illustrates a vehicle 10 having a frame 12 defining a passenger cabin 14. The frame 12 may include a pair of opposed side roof rails 16 supporting a roof 18 above the cabin 14. The roof 18 may include an opening 20 for a sunroof 22. As used herein, a sunroof is any kind of panel on the roof of a vehicle that permits light, air or both to come into the vehicle. The sunroof 22 may include a seal 24 around the opening 20 between a movable sunroof panel 26 and the roof 18. The sunroof panel 26 may move between an opened position and a closed position, exposing at least a portion of the opening 20, either by a sliding motion or by a tilting motion of the sunroof panel. A mechanism (not shown) for selectively moving the sunroof panel 26 may be driven either manually or by an external power source such as an electric motor (not shown).

The vehicle 10 may include a drainage system 28 for the sunroof 22. A gutter or trough 30 around the opening 20 just below the sunroof panel 26 may collect drainage, such as rain water, preventing it from entering the cabin 14. The drainage may collect in the trough 30 and exit through an aperture 32. The aperture 32 may be formed in a corner 34 of the trough. A first drain tube 36 may be fluidly connected to the aperture 32 to receive the collected drainage from the trough 30 and direct it away from the opening 20. An inlet portion 38 of the first drain tube 36 may connect to the aperture 32.

The vehicle frame 12 may include pillars 40, which are the vertical or near vertical supports of the vehicle around the window area. Again, the pillars 40 may be designated as the A-, B-, C- or (in larger cars) D-pillar, moving longitudinally from the front to rear of the vehicle. Accordingly, the vehicle 10 may include at least an A-pillar 40a, a B-pillar 40b, and a C-pillar 40c. In addition to providing structural support, vehicle content may be packaged inside the pillars, such as speakers, seat restraints, wires, and the like. According to one or more embodiments, at least one pillar 40 may include an HVAC duct (or air duct) 42 to distribute air to the passenger cabin 14. For example, the C-pillar 40c may house the air duct 42 to distribute air towards a rear of the cabin 14. The C-pillar 40a will continue to be used throughout the present disclosure to describe various embodiments, though these embodiments may be equally employed in other pillars 40 of the vehicle 10. According to one or more additional embodiments, the air duct 42 may include an integrally formed drainage conduit 44. An outlet portion 46 of the first drain tube 36 may connect to an inlet 48 of the drainage conduit 44 for further directing the drainage away from the opening 20 and the trough 30.

Figure 2:
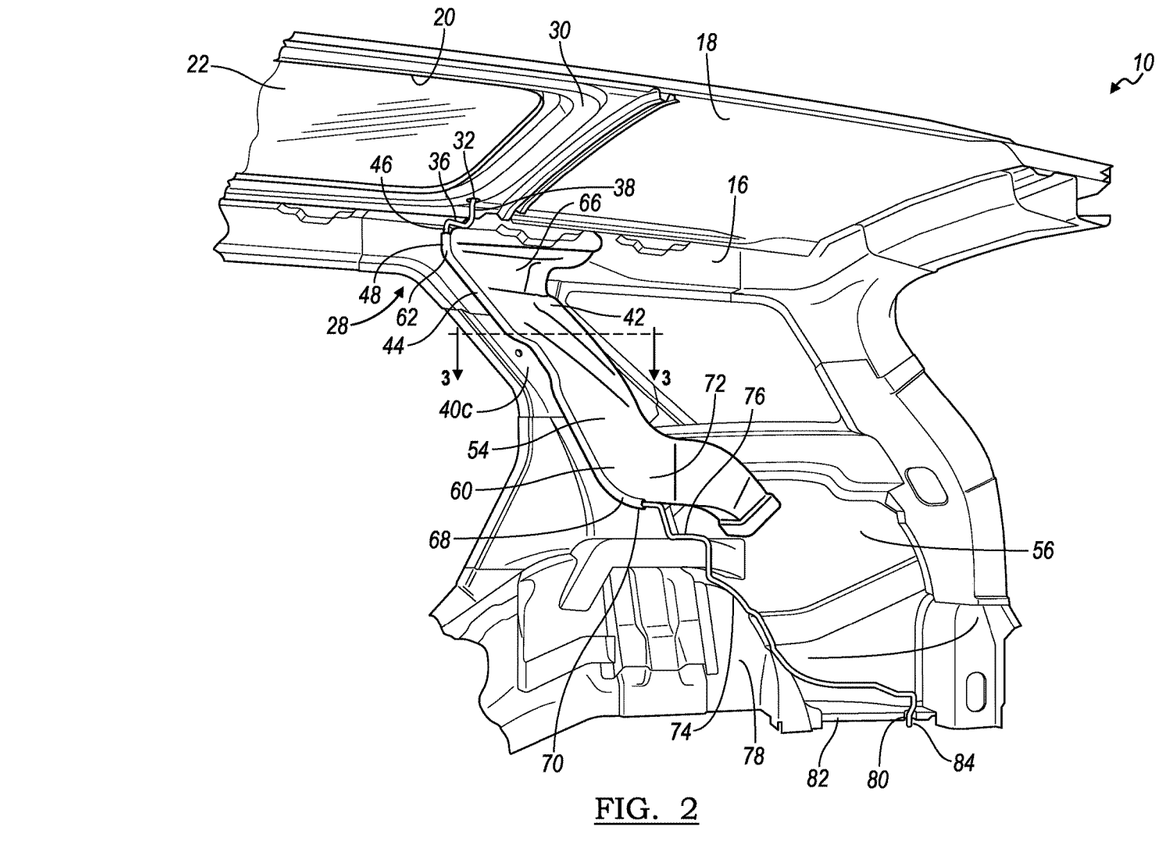
FIG. 2 is a partial side perspective view of the vehicle with an interior trim panel removed showing an air duct mounted to a C-pillar, according to one embodiment of the present disclosure.

FIG. 2 shows the sunroof drainage system 28 in greater detail. As shown, the inlet portion 38 of the first drain tube 36 may connect to the aperture 32 in the trough 30 using known techniques. At least a portion of the first drain tube 36 may feed toward the C-pillar 40c along the roof rail 16. The air duct 42 may be mounted to the C-pillar 40c using attachments (not shown) located at various attachment points. The air duct 42 may be an elongated, hollow body 54 extending from the roof rail 16 along the length of the C-pillar 40c. In certain embodiments, the air duct 42 may extend beyond the pillar and along an outer trim panel 56. The hollow body 54 of the air duct 42 may define an air passage 58 (FIG. 3) for air being distributed to the rear of the cabin 14 by a climate system (not shown). The source of the air may come from either a primary or auxiliary climate system. The air duct 42 may be formed from plastic using a process such as blow molding, injection molding, or compression molding.

The drainage conduit 44 may be integrally formed on a surface of the air duct during the molding process. Integrating the drainage conduit 44 into the air duct 42 may reduce the number of parts in the vehicle 10 overall and, in particular, result in fewer parts packaged into the pillar 40. This may lead to more efficient use of packaging space in the pillar and reduced labor to install. It may also reduce the number of attachment points over separate components, thereby reducing chances of rattle. The integrated drainage conduit 44 may allow for narrower pillars, or at least prevent the need to widen pillars. It may also prevent the need for smaller duct cross-sections, negatively impacting ducting/cooling performance.

Figure 3:
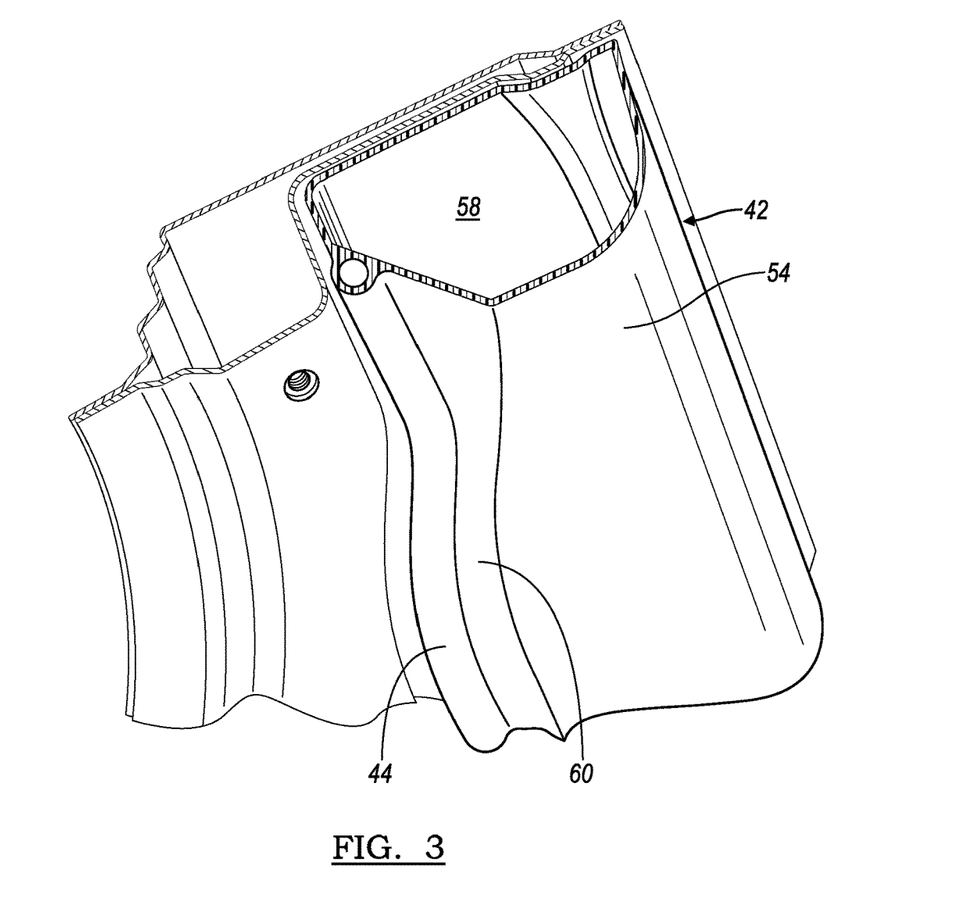
FIG. 3 is a partial perspective, sectional view of the air duct in FIG. 2 having an integrated drainage conduit taken along line 3-3.
Figure 4:
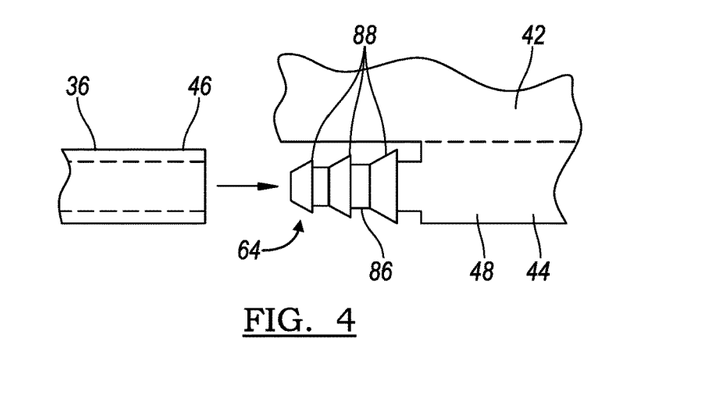
FIG. 4 is a view of one example of a connection between a drain tube and the drainage conduit, according to an embodiment of the present disclosure.

As shown in FIGS. 2 and 3, the drainage conduit 44 may be integrally formed on an outside surface 60 of the body 54 of the air duct 42. As will be described in greater detail below, the drainage conduit 44 may also be formed on an inside surface of the body of the air duct. The outlet portion 46 of the first drain tube 36 may connect to the inlet 48 at a first end 62 of the drainage conduit 44 using a connector 64 (FIG. 4). The inlet 48 may be located near a top portion 66 of the air duct 42. The drainage conduit 44 may extend along much of the length of the air duct 42, following its contour.

The drainage conduit 44 may include a second end 68 having an outlet 70 near a bottom portion 72 of the air duct 42. According to one or more embodiments, the drainage system 28 may include a second drain tube 74 connected to the outlet 70 of the drainage conduit 44. The second drain tube 74 may include an inlet portion 76 connected to the outlet 70 using a connector 64, similar to FIG. 4. The second drain tube 74 may feed along an inside surface of the outer trim panel 56, further directing the drainage away from the opening 20 in the roof 18 occupied by the sunroof 22. For example, at least a portion of the second drain tube 74 may extend along a portion of a wheel well 78 and down into a hole 80 in the floor pan 82. The second drain tube 74 may include an outlet portion 84 where the drainage may exit the vehicle 10 to ambient.

FIG. 4 depicts one example of a connector 64 for connecting the first drain tube 36 to the drainage conduit 44. For instance, the connector 64 may be a male hose adapter 86 affixed to the inlet 48 of the drainage conduit 44. The adapter 86 may have multiple barbs 88 to assist with retention once the outlet portion 46 of the drain tube 36 is fitted over the adapter 86. A similar connector 64 may be employed to connect the inlet portion 76 of the second drain tube 74 to the outlet 70 of the drainage conduit 44.

Figure 5:
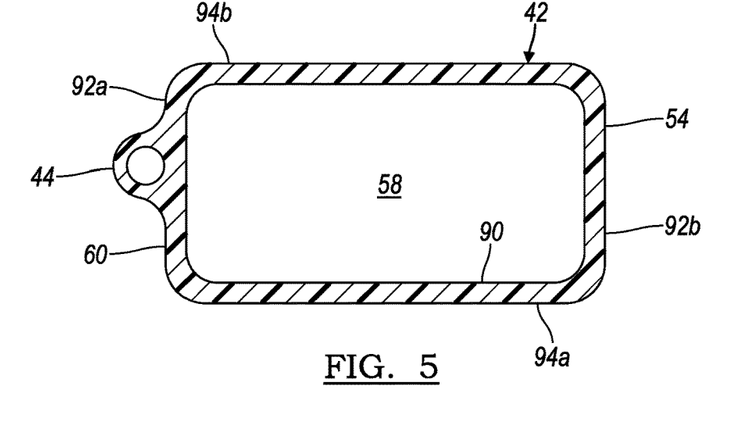
FIG. 5 is a sectional view of an air duct having an integrated drainage conduit, according to one embodiment of the present disclosure.

FIG. 5 is a sectional view of the air duct 42 having the integrated drainage conduit 44 shown in FIGS. 2 and 3, according to one or more embodiments of the present disclosure. For ease of illustration, the air duct 42 is shown as being generally rectangular, although other embodiments may have differently shaped cross-sections, such as shown in FIG. 3. The hollow body 54 of the air duct 42 may include the outside surface 60 and an inside surface 90 defining the air passage 58. The body 54 may comprise a pair of generally opposed side walls 92 and a pair of generally opposed elongated walls 94 connecting the two side walls 92. The side walls 92 may include a first side wall 92*a* and a second side wall 92*b*. The elongated walls 94 may include an inboard elongated wall 94*a* (generally facing the passenger cabin 14) and an outboard elongated wall 94*b* (facing the vehicle's exterior). The side walls 92 and elongated walls 94 are shown as being relatively straight with defined corners for ease of illustration. However, in one or more embodiments, these walls may be contoured and/or gradually transition from one surface to another. The drainage conduit 44 may be integrally formed on the outside surface 60. As shown in FIG. 5, the drainage conduit 44 may be integrally formed on the outside surface 60 of one of the side walls 92, such as the first side wall 92*a*. Alternatively, the drainage conduit 44 may be integrally formed on the outside surface 60 of one of the elongated walls 94.

Figure 6:
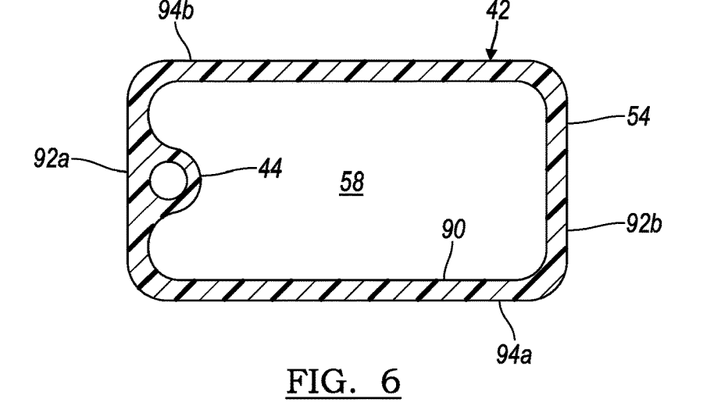
FIG. 6 is an alternative sectional view of the air duct, according to one embodiment of the present disclosure.
Figure 7:
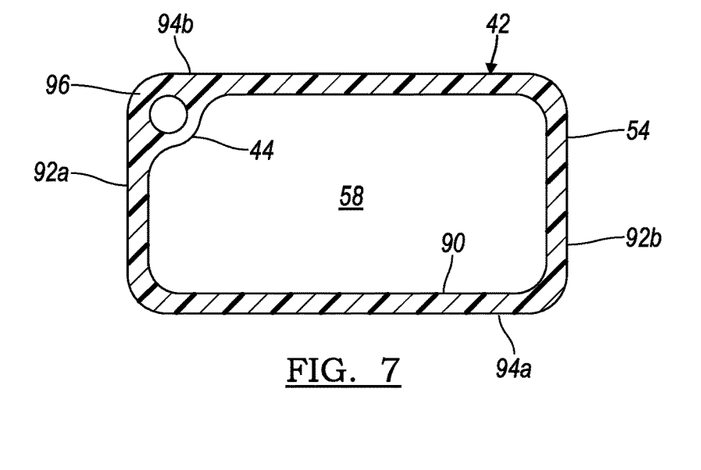
FIG. 7 is another alternative sectional view of the air duct made according to one embodiment of the present disclosure.

FIG. 6 is another example of a sectional view of the air duct 42, according to one or more additional embodiments of the present disclosure. As shown, the drainage conduit 44 may be integrally-formed on the inside surface 90 of the air duct 42. FIG. 7 is another sectional view of the air duct 42. As shown, the drainage conduit 44 may be integrally-formed on the inside surface 90 in a corner 96 of the air duct 42.

Figure 8:
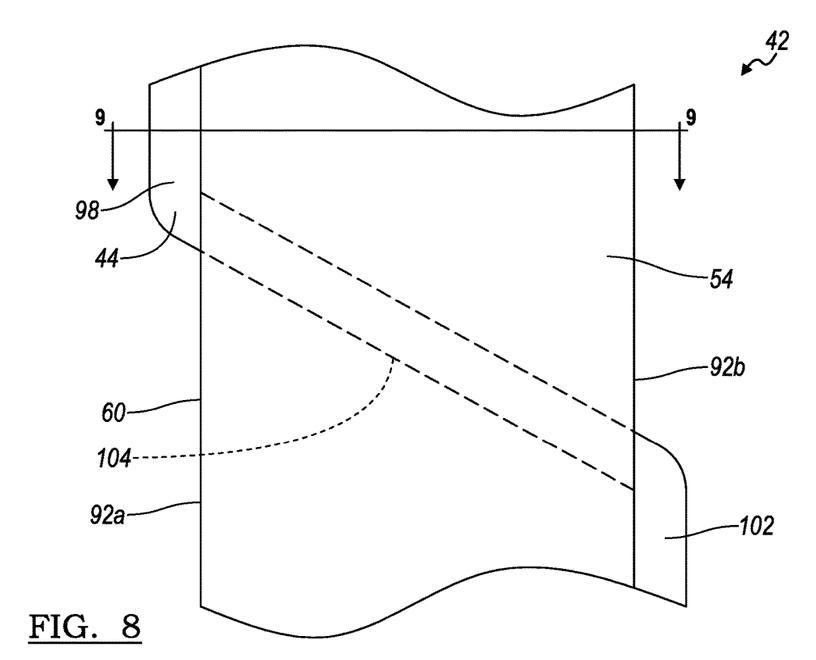
FIG. 8 is a partial side view of the air duct having an alternate drainage conduit configuration made according to one embodiment of the present disclosure.
Figure 9A:
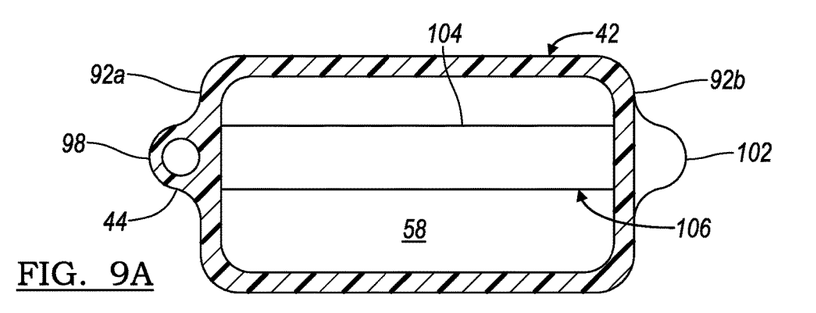
FIG. 9a is a sectional view taken along line 9-9 of FIG. 8.
Figure 9B:
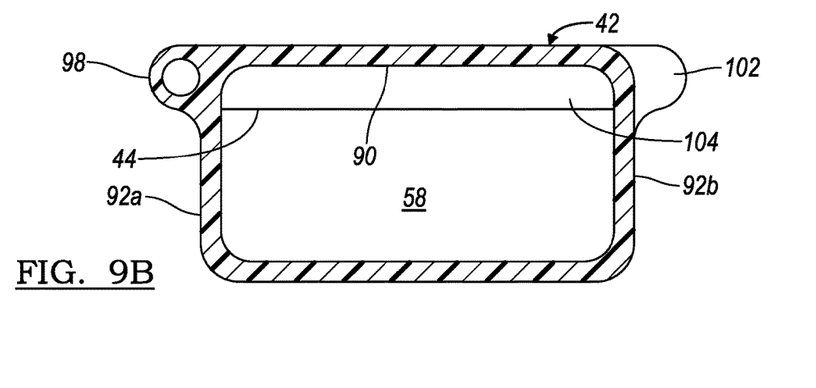
FIG. 9b is an alternative sectional view taken along line 9-9 of FIG. 8.

FIGS. 8 and 9*a-b* illustrate another embodiment of the integrated air duct 42. As shown, the drainage conduit 44 may be generally formed on the outside surface 60 of the body 54 and feed through the duct's air passage 58. Accordingly, the drainage conduit 44 may have a first substantially vertical portion 98 integrally-formed on the first side wall 92*a* and a second substantially vertical portion 102 integrally-formed on the second side wall 92*b*. The drainage conduit 44 may include a transverse portion 104 extending across the air passage 58 and connecting the first substantially vertical portion 98 to the second substantially vertical portion 102. The transverse portion 104 may be sloped downward from the first substantially vertical portion 98 to the second substantially vertical portion 102 to facilitate drainage.

As shown in FIG. 9*a*, the transverse portion 104 of the drainage conduit 44 may feed through a middle 106 of the air passage 58. FIG. 9*b* illustrates an alternate sectional view where the transverse portion 104 may be routed along the inside surface 90 of the air duct 42, such as the inside surface of the outboard elongated wall 94*b*.

Figure 10:
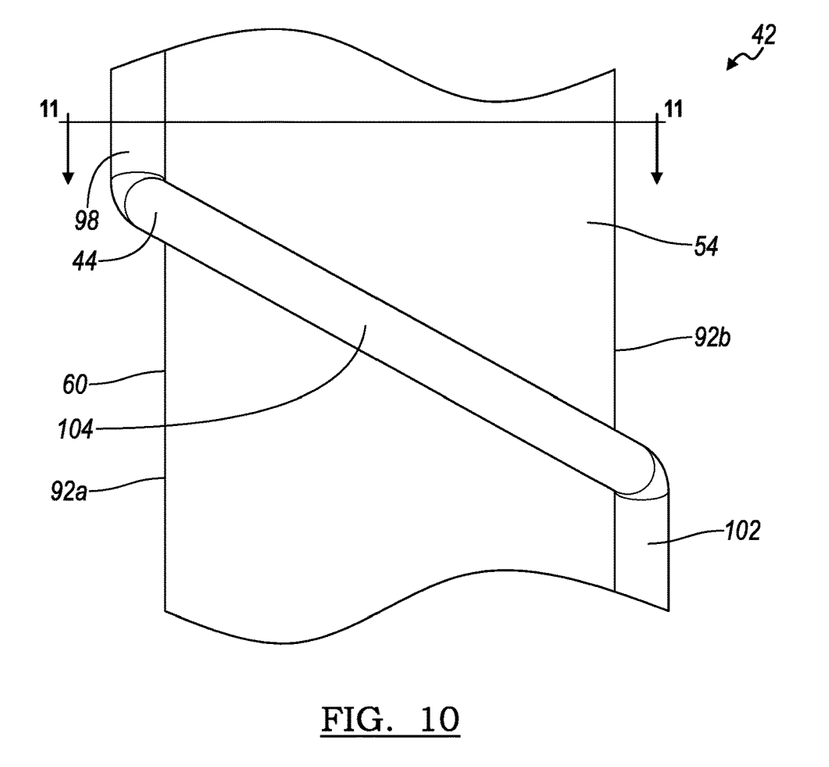
FIG. 10 is a partial side view of an alternative air duct having another drainage conduit configuration, according to one embodiment of the present disclosure.
Figure 11:
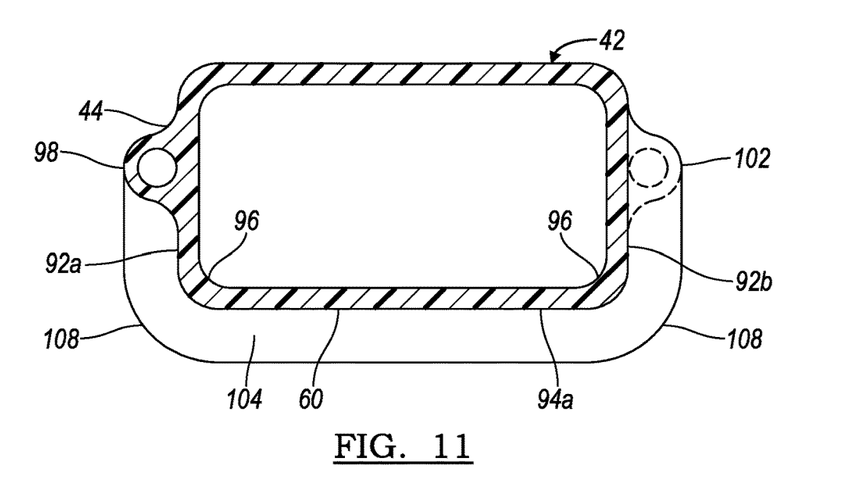
FIG. 11 is a sectional view taken along line 11-11 of FIG. 10.

FIGS. 10 and 11 illustrate yet another embodiment of the integrated air duct 42, according to one or more embodiments of the present disclosure. As shown, the drainage conduit 44 may feed around the outside surface 60 from one side to another side. Like in the previous embodiment, the first substantially vertical portion 98 may be integrally-formed on the first side wall 92*a*. In this embodiment, the transverse portion 104 of the drainage conduit 44 may be routed around the outside surface 60 of the air duct 42 along at least one of the elongated walls 94, such as the inboard elongated wall 94*a*. The transverse portion 104 may include at least one bend 108 formed around the corner 96 of the air duct 42 between the first side wall 92*a* and the inboard elongated wall 94*a*. The second substantially vertical portion 102 may be integrally-formed on the second side wall 92*b* as shown. Accordingly, the transverse portion 104 may include another bend 108 formed around the corner 96 of the air duct 42 where the inboard elongated wall 94*a* meets the second side wall 92*b*. Alternatively, the second substantially vertical portion 102 may be integrally-formed on one of the elongated walls 94.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An air duct for a vehicle having a sunroof comprising:
   an elongated, hollow body defining an air passage for a climate system;
   a drainage conduit integrally formed on an outside surface of the body;
   an inlet at a first end of the conduit for receiving drainage from the sunroof; and
   an outlet at a second end of the conduit for draining the drainage to ambient;
   wherein the body includes at least a first side wall and an elongated wall connecting the first side wall to a second side wall opposite the first side wall, the conduit including a first substantially vertical portion formed on the first side wall, a second substantially vertical portion formed on the second side wall, and a transverse portion formed at least partially on the elongated wall, the transverse portion connecting the first substantially vertical portion to the second substantially vertical portion.

2. The air duct of claim 1, wherein the transverse portion feeds across the air passage along an inside surface of the body.

3. The air duct of claim 1, wherein the transverse portion includes a bend at a first corner of the body where the first side wall meets the elongated wall.

4. The air duct of claim 3, wherein the transverse portion includes another bend at a second corner of the body where the elongated wall meets the second side wall.

5. A drainage system comprising:
a duct, mounted to a vehicle pillar, having a hollow body defining an air passage and a drainage conduit integrally formed on an outside surface of the body, the conduit including a first vertical portion on a first side wall of the body, a second vertical portion on a second side wall opposite the first side wall, and a transverse portion extending therebetween.

6. The drainage system of claim 5, further comprising a drain tube, wherein the conduit includes an inlet and an outlet, the drain tube connecting a sunroof to the inlet.

7. The drainage system of claim 6, further comprising a second drain tube connecting the conduit to ambient, the second drain tube having an inlet portion connected to the outlet of the conduit and an outlet portion coupled to ambient.

8. The drainage system of claim 6, wherein the sunroof includes a trough having an aperture, the drain tube including an inlet portion connected to the aperture and an outlet portion connected to the inlet of the conduit.

9. The drainage system of claim 5, wherein the transverse portion is formed at least partially on an elongated wall connecting the first side wall to the second side wall.

10. The drainage system of claim 5, wherein the transverse portion extends across the air passage connecting the first vertical portion to the second vertical portion.

11. The drainage system of claim 10, wherein the transverse portion extends across the air passage along an inside surface of the body.

12. A vehicle comprising:
a frame including a pillar;
a roof having an opening;
a sunroof selectively exposing a portion of the opening;
an HVAC duct, mounted to the pillar, having a hollow body defining an air passage for a climate system and a drainage conduit integrally formed on the body; and
a drain tube extending from the sunroof to an inlet on the conduit;
wherein the body includes at least a first side wall and a second side wall opposite the first side wall, the conduit including a first substantially vertical portion formed on the first side wall, a second substantially vertical portion formed on the second side wall, and a transverse portion extending across the air passage connecting the first substantially vertical portion to the second substantially vertical portion.

13. The vehicle of claim 12, further comprising a second drain tube extending from an outlet on the conduit to ambient.

14. The vehicle of claim 12, wherein the conduit is integrally-formed on an inside surface of the body.

15. The vehicle of claim 12, wherein the conduit is integrally-formed on an outside surface of the body.

* * * * *